No. 672,013. Patented Apr. 16, 1901.
B. I. RYDBERG.
DIFFERENTIAL GEARING.
(Application filed Sept. 7, 1899.)
(No Model.)
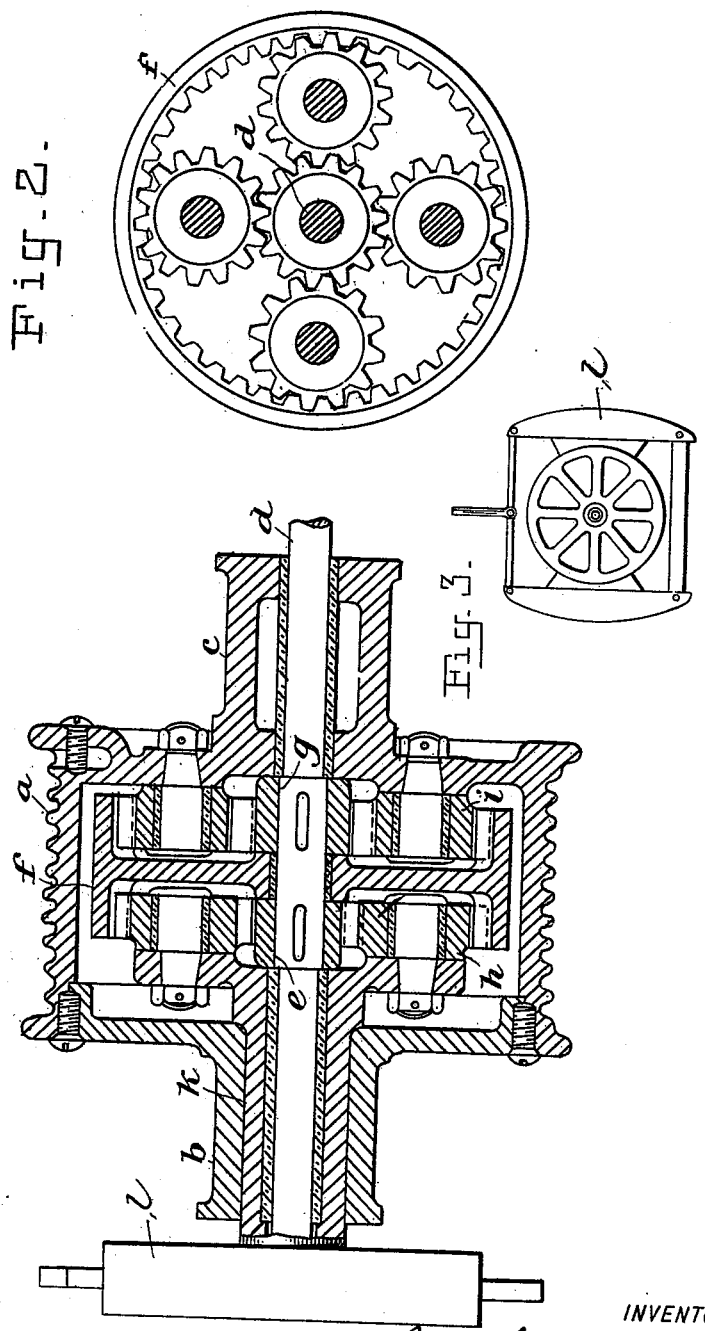
WITNESSES:
INVENTOR
Birger Isidor Rydberg
BY
ATTORNEYS

UNITED STATES PATENT OFFICE.

BIRGER ISIDOR RYDBERG, OF WESTANFORS, SWEDEN.

DIFFERENTIAL GEARING.

SPECIFICATION forming part of Letters Patent No. 672,013, dated April 16, 1901.

Application filed September 7, 1899. Serial No. 729,767. (No model.)

*To all whom it may concern:*

Be it known that I, BIRGER ISIDOR RYDBERG, engineer, a subject of the King of Sweden and Norway, and a resident of Westanfors, in the Kingdom of Sweden, have invented certain new and useful Improvements in Differential Gearings, of which the following is a specification, reference being had therein to the accompanying drawings.

This invention relates to differential gearings, which are principally characterized by a wheel loosely mounted on the driving-shaft and provided with two inwardly-directed rolling-paths, opposite each of which there is rigidly attached to the shaft mentioned a wheel, which wheels are of different diameters, while on pins or the like on the part to be driven there are loosely mounted wheels engaging with one of the wheels fixed on the shaft and with the opposite path of the loose wheel, other wheels, moreover, loosely mounted on pins or the like on a part which is stationary or fitted with a brake, being in engagement with the other fixed wheel on the shaft and the other path of the loose wheel.

The invention is illustrated in the drawings adjoined, in Figures 1 and 2, as applied to a rope-drum or the drum of a winch. Fig. 3 is a detail view of the braking device.

The drum $a$ is provided with trunnions $b$ and $c$, intended to rest in corresponding boxes on the frame. Said trunnions are made hollow in order to provide space for the driving-shaft $d$, which carries three toothed or friction wheels $e\,f\,g$ inside the drum. The wheels $e$ and $g$ are of different diameters and keyed to the shaft $d$. Wheel $f$, on the other hand, runs loosely on the shaft and is provided with two inwardly-directed paths. The motion of the driving-shaft $d$ is transmitted to wheel $f$ by means of the additional wheels $h$ and $i$, of which the wheels $h$ are loosely mounted on pins or studs projecting from a flange on the bushing $k$, passing with a loose fit between the driving-shaft $d$ and trunnion $b$, while the wheels $i$ are loosely mounted on pins or studs projecting from one of the end walls of the drum. The above-mentioned bushing $k$ is connected with the frame by means of a braking device $l$, so that when the driving-shaft $d$ is set in motion the drum $a$ will be compelled to take part in the rotation at a velocity which has a fixed relation to the diameters of the wheels mentioned.

The advantages gained by this invention are as follows: First, ease of obtaining any ratio of gearing; second, a power or transmission device of great strength with comparatively small gear-wheels, because of the fact that several intermediate wheels $h$ and $i$ may be employed, each acting on a separate pin or stud; third, the gear as a whole occupies but small space; fourth, all parts are well protected from dust, grit, &c.; fifth, no open trains of gears or projecting parts are present which may be dangerous to the workmen, and, sixth, the loss of power through friction is small.

Having now described my invention, what I claim as new, and desire to secure by Letters Patent, is—

1. In combination, the driving-shaft $d$, the wheel $f$ loosely mounted thereon having two inwardly-directed paths, a wheel rigidly mounted on said shaft opposite each path, said wheels being of different diameters, a part to be driven, wheels interposed between and engaging one of said paths and its respective wheel on the shaft, a second part independent of said part to be driven, and similar wheels interposed between and engaging the other path and its respective wheel, and braking means for said second part, substantially as described.

2. In combination, the driving-shaft $d$, the wheel $f$ loosely mounted thereon having two inwardly-directed paths, a wheel rigidly mounted on said shaft opposite each path, said wheels being of different diameters, a rope-drum inclosing said wheel $f$, wheels carried thereby extending between and engaging one of said paths and its respective wheel, a sleeve encircling the shaft at one side, and wheels carried by said sleeve and extending between and engaging the opposite path and its respective wheel, and braking means for said sleeve, substantially as described.

3. In combination, the driving-shaft $d$, the wheel $f$ loosely mounted thereon having two inwardly-directed paths, a wheel rigidly mounted on said shaft opposite each path, said wheels being of different diameters, a rope-drum inclosing said wheel $f$ and having hollow trunnions at each end encircling the shaft, wheels carried by said rope-drum extending between and engaging one of said paths and its respective wheel, a sleeve encircling the shaft at one side, and wheels carried by said sleeve and extending between and engaging the opposite path and its respective wheel, and braking means for said sleeve, substantially as described.

In witness whereof I have hereunto signed my name in the presence of two subscribing witnesses.

BIRGER ISIDOR RYDBERG.

Witnesses:
AXEL SPJUBLE,
GUSTAF LINDBERG.